United States Patent Office 3,003,364
Patented Oct. 10, 1961

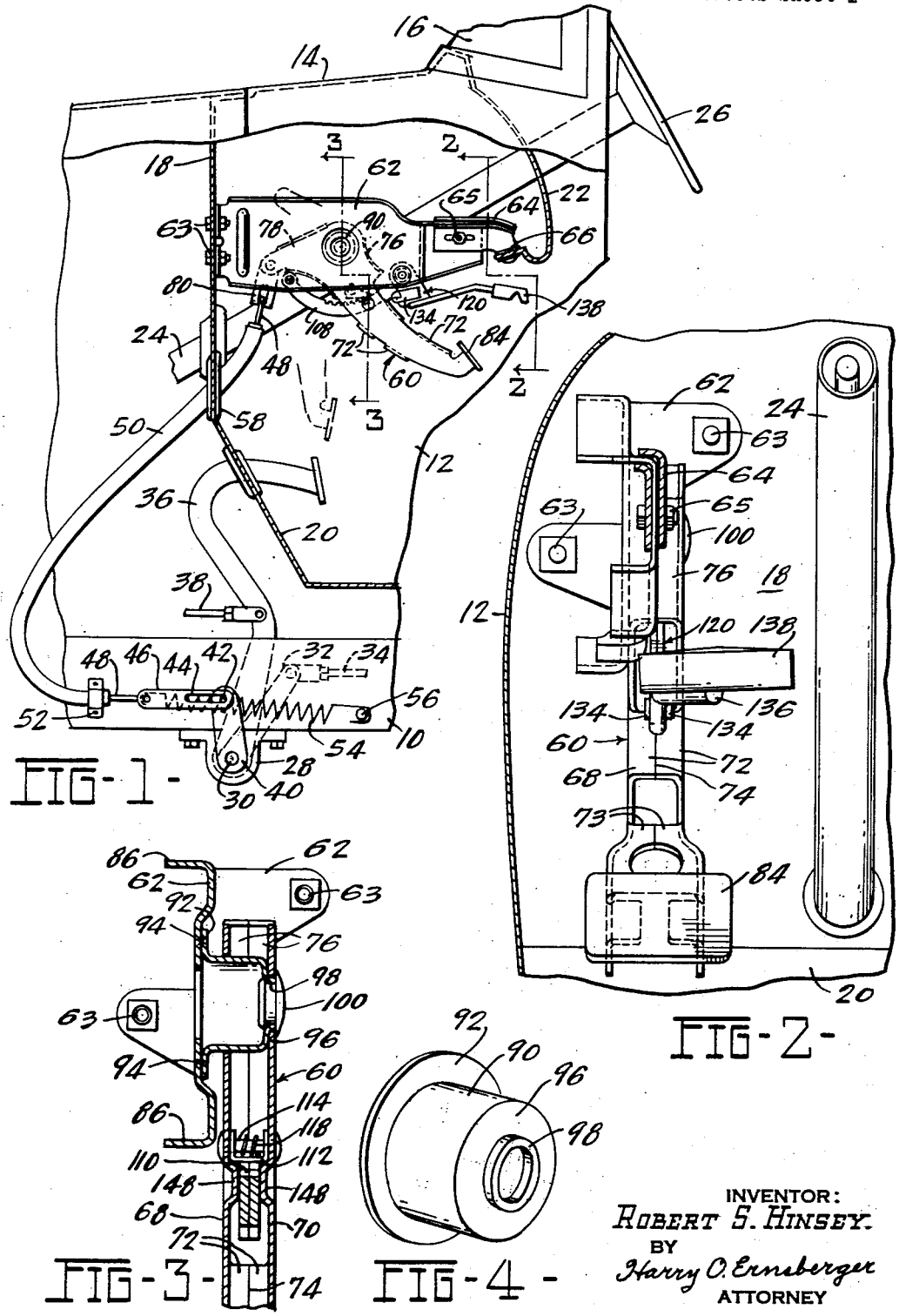

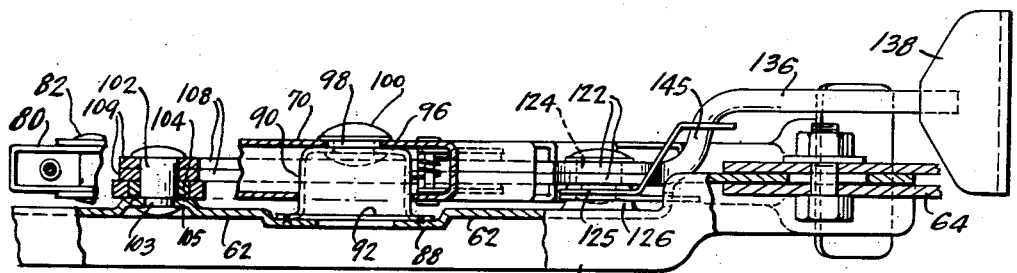
FIG-5-
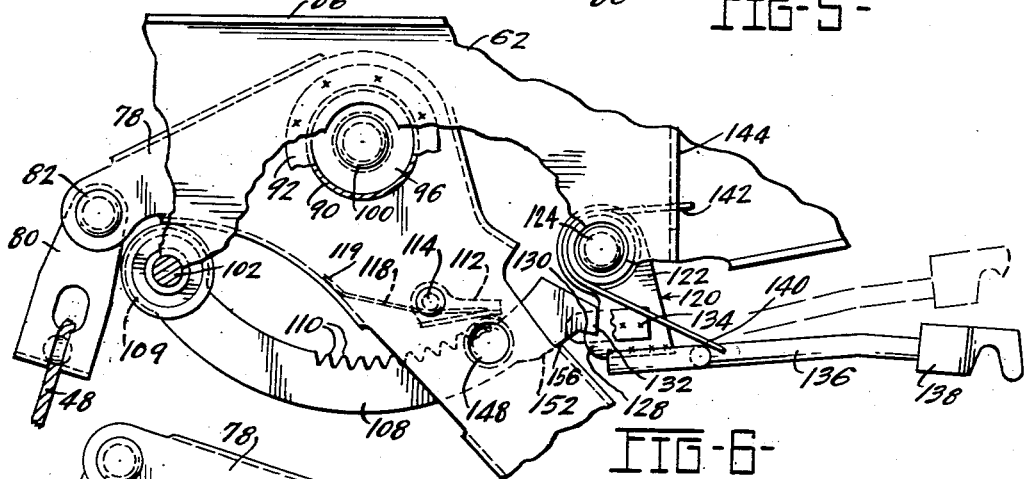
FIG-6-
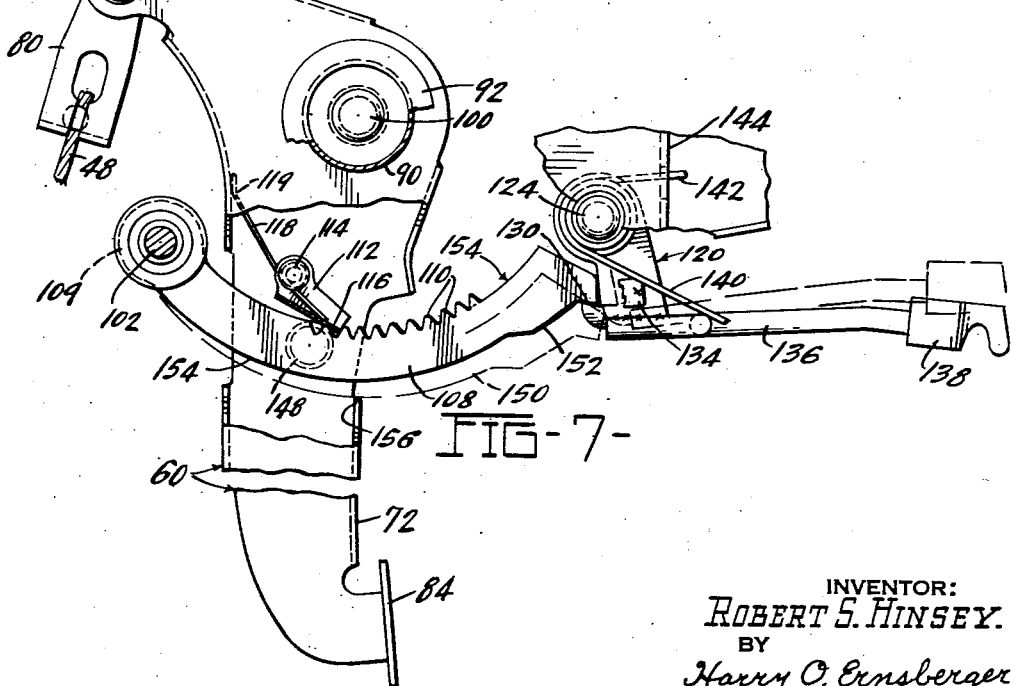
FIG-7-
INVENTOR:
ROBERT S. HINSEY.
BY
Harry O. Ernsberger
ATTORNEY

3,003,364
MECHANISM CONTROL
Robert S. Hinsey, Toledo, Ohio, assignor to The Bingham-Herbrand Corporation, Toledo, Ohio, a corporation of Ohio
Filed Jan. 23, 1959, Ser. No. 788,640
12 Claims. (Cl. 74—534)

This invention relates to mechanism control and more especially to a means or apparatus for actuating or controlling the parking or emergency brakes of a vehicle.

Various forms of hand-operated and foot-operated devices have been developed and utilized for actuating or controlling the parking or emergency brakes of automotive vehicles. Foot-operated lever means have been utilized embodying a manually controlled pawl carried by the lever arranged for cooperation with a stationary toothed sector or ratchet means for holding the brake actuating lever in brake-setting positions.

In arrangements of this character, a manually-operated member operatively connected with the pawl is movable to disengage the pawl from the stationary sector teeth to release the brake actuating lever for movement to brake release position. In such constructions there is liability of stripping or damaging the ratchet teeth by premature engagement of the pawl with the ratchet teeth during movement of the brake actuating lever to brake release position unless the release means is manually held in release position during the entire movement of the lever to brake release position.

The trend in automobile vehicle design is toward lower bodies and chassis construction and in such designs the available space for a foot-operated parking brake actuating means is decreased. Foot-operated devices or mechanisms embodying pawl and ratchet retaining means have been developed wherein a ratchet mechanism is disposed above the fulcrum of the foot-operated lever, that is, at the load arm region of the lever construction.

In such arrangements the pawl, which cooperates with the ratchet means, is carried by the lever above the fulcrum near the point of connection of the load arm of the lever with a cable or other means connected with the brake mechanism. The reduction in available space for the emergency brake actuating mechanism in a vehicle renders difficult the use of a brake actuating means wherein the ratchet and pawl mechanism is located or disposed above the fulcrum of the lever.

The present invention embraces a foot-operated lever arrangement for actuating or controlling vehicle parking or emergency brake mechanism embodying a lever retaining ratchet and pawl means disposed below or beneath the fulcrum of the lever which is reliable in its operation and is equipped with release mechanism conveniently accessible to the operator.

Another object of the invention is the provision of a foot-operated lever arrangement for actuating and controlling the parking or emergency brakes embodying a pawl and ratchet means for securing the lever in brake-setting position wherein the ratchet means is articulately disposed in a region below the fulcrum of the foot-operated lever and is cooperable with a pawl movably carried by the lever.

Another object of the invention resides in a mechanism control of this character wherein the foot-operated lever is substantially of the bell crank shape or configuration wherein the pawl means of a pawl and ratchet retaining device is pivotally supported by the lever intermediate the lever fulcrum and the foot receiving pad portion, the pawl cooperating with a relatively movable ratchet member which is adapted to be released by the operator and returned to operative brake-setting position by movement of the foot-operated lever into brake release position.

Another object of the invention resides in a novel means of articulately or pivotally supporting the lever construction at one side of a supporting bracket wherein transversely spaced bearing means are provided to minimize wear of the relatively movable surfaces at the pivot or fulcrum region of the lever.

Another object of the invention resides in the provision of a lightweight foot-operated lever formed of sheet metal components and a method of supporting the lever upon a bracket at one side thereof in a manner to provide a stable and rigid mounting for the lever construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of an automotive vehicle, certain portions being broken away, illustrating a form of mechanism control of the invention;

FIGURE 2 is a vertical sectional view taken substantially on the line 2—2 of FIGURE 1;

FIGURE 3 is a detail sectional view taken substantially on the line 3—3 of FIGURE 1;

FIGURE 4 is an isometric view of the bearing construction upon which the foot-operated lever is fulcrumed or articulately supported;

FIGURE 5 is a top plan view of the lever construction, certain parts being broken away and others shown in section for purposes of illustration;

FIGURE 6 is a fragmentary side elevational view of a portion of the lever and the pawl and ratchet means showing the lever in brake release position, and FIGURE 7 is a view illustrating the position of the components of the mechanism with the foot-operated lever in a brake-setting position.

While the control mechanism illustrated herein is particularly adapted for installation in an automotive vehicle for use in actuating or controlling the emergency or parking brakes, it is to be understood that the arrangement of the invention may be utilized for controlling other mechanisms or wherever the same may be found to have utility.

Referring to the drawings in detail and initially to FIGURE 1, there is illustrated an installation of the foot-operated mechanism control of the invention disposed in the operator's compartment of a vehicle adapted for controlling the parking or emergency brakes of the vehicle. The portion of the vehicle illustrated includes longitudinal chassis frame members, one of which is shown at 10 upon which is mounted a body 12 having a cowl portion 14, a windshield 16, a dashboard or firewall 18, a toe board 20 and an instrument panel 22. The arrangement includes a steering post 24 provided with a steering wheel 26.

The frame members 10 are connected by cross members (not shown). Secured to the frame members 10 are brackets 28, one of which is shown in FIGURE 1, in which a transversely extending shaft 30 is journally supported. Fixed upon the shaft 30 is an extending arm 32 which is connected by means of a rod 34 or other means with the parking brakes of the vehicle (not shown) associated with a pair of road wheels of the vehicle, the parking brake mechanism being of conventional construction.

A service brake pedal 36 may also be journaled on the shaft 30 and is connected by a rod 38 with conventional hydraulic mechanism (not shown) for actuating the service brakes of the vehicle. Also secured upon the shaft 30 is an arm 40 provided at its distal end with a pin 42 arranged for traverse in a slot 44 formed in a link or member 46. One end of a flexible cable 48 is connected to the link 46, the cable being slidable within a tubular sheath 50, the lower end of which is secured to the frame member 10 by a bracket or clip 52.

A contractile spring 54 is connected with the link 46 and an anchor member 56 carried by the frame member 10, the spring 54 in conjunction with the conventional brake return spring mechanism (not shown) serving to normally bias the link 46 toward brake released position, viz. in a right-hand direction as viewed in FIGURE 1. The sheath 50 enclosing the flexible brake actuating cable 48 extends through a grommet 58 carried by the firewall 18. The upper end of the sheath 50 may be secured to the firewall by means of a clip (not shown).

The mechanism control of the invention includes a foot-operated lever construction or lever 60 which is articulately supported or fulcrumed upon a bracket 62 in a manner hereinafter described. The forward end of the bracket or lever support 62 is secured to the firewall by means of bolts 63. Carried by the rearward region of the bracket 62 is an adjustable clip or bracket 64 secured by a bolt 65. The clip 64 is secured to a flange 66 of the instrument panel 22. In this manner the support or bracket 62 is rigidly mounted by the firewall and the instrument panel.

In the illustrated embodiment, the lever construction 60 is preferably formed of mating sheet metal sections 68 and 70, each section being formed with inwardly extending flange portions 72 and 73 which are welded together at a median line 74. The upper portions of the lever sections are likewise formed with inwardly extending flanges 76 which are welded together along the median line 74.

In the embodiment illustrated, the lever construction is carried by and arranged at one side of the support or bracket 62. The lever construction is formed with a forwardly extending load arm portion 78. The upper end of the flexible brake-actuating cable 48 is provided with a clevis 80 which is secured to the forwardly extending lever arm 78 by means of a stub shaft or rivet 82 extending through registering openings in the lever portion 78 and the clevis member 80. The opposite end of the foot-operated lever is provided with a foot pad portion 84.

The supporting bracket 62 is formed at its upper and lower edge regions with laterally extending flanges 86 to provide a rigid and stable support for the lever construction. As shown particularly in FIGURE 3, a central region 88 of the support is embossed from the planar area thereof which is adapted to support a bearing means upon which the foot-operated lever is fulcrumed or pivoted. The bearing means 90 is of cup-shaped configuration having at one end an outwardly extending circular flange 92 which is welded throughout a peripheral region to the embossed portion 88 of the support 62, the welds being indicated at 94 in FIGURE 3.

The opposite end region of the cup-shaped member 90 is formed with an inwardly extending portion 96 which terminates in an axially extending annular flange 98. The section or component 68 of the lever construction is formed with an opening to receive the cup-shaped member 90 and the lever section 70 is formed with an opening to accommodate the annular axially extending flange or bearing portion 98 of the cup-shaped member in the manner shown in FIGURE 3.

A rivet 100 has head portions which respectively engage the inwardly extending flange 96 of the bearing member and the exterior surface region of the lever section 70 to secure the lever construction in pivotal relation with the bearing means 90 and 98, the axis of the bearing portions 90 and 98 being the fulcrum of the lever 60.

The openings in the lever sections accommodating the bearing means 90 and 98 are such as to snugly fit the bearing areas of the member 90 but permit pivotal movement of the lever construction relative to the bearing means. Through this arrangement a stable mounting is provided for the lever construction at one side of the support or bracket 62 which makes possible the construction of a support of lighter weight than has heretofore been possible in lever supporting means of this general character.

The depending portion of the lever carrying the foot pad 84 is disposed substantially at a right angle to the load arm 78 of the lever whereby the lever is of bell crank shape. The arrangement of the invention is inclusive of cooperating clutch or lever locking means or members respectively connected with the support 62 and the lever 60 for retaining the lever construction in brake-setting positions. As particularly shown in FIGURES 5 and 6, a rivet or stub shaft 102 has a tenon portion 103 secured to the support 62. An annular member 104 is welded to an embossed portion 105 on the support or bracket 62 to provide a bearing support for the rivet 102.

In the arrangement illustrated, one of the cooperating clutch members or locking means is in the form of a toothed ratchet and the other cooperating clutch means in the form of a pawl or detent adapted for cooperation with the ratchet means. The ratchet means in the arrangement illustrated comprises a pair of identically shaped bars or elements 108 provided with enlarged circular head portions 109 which are bored to be snugly received on the body of the rivet 102 as shown in FIGURE 5, the bars or elements 108 being mounted for pivotal movement on the rivet 102.

The bars or elements 108 are formed with ratchet teeth 110, the teeth of both bars being in transverse aligned relation as illustrated in FIGURES 6 and 7. The teeth 110 on the bars 108 are arranged in an arc generated about a radius with the axis of the rivet 100 as a center, the axis of the rivet being the fulcrum of the lever 60. The cooperating clutch member or pawl 112 carried by the lever 60 is pivotally mounted upon a rivet 114 as particularly shown in FIGURES 3 and 7. The clutch member or pawl 112 is preferably of channel-shaped cross-section, the parallel side walls of the pawl having aligned openings to accommodate the rivet 114 which extends through openings formed in the lever sections or components 68 and 70.

The distal end region of the web portion or bight portion 116 of the pawl 112 is adapted for engagement with the ratchet teeth 110 for securing the lever 60 in brake-setting positions. The pawl 112 is normally biased into engagement with the ratchet teeth 110 under the influence of a spring or resilient means 118.

In the embodiment illustrated, the central region of the spring 118 is coiled about the rivet 114, one end 119 of the spring engaging a flange portion of the lever construction, the other end of the spring engaging the web or bight portion 116 of the pawl 112.

The arcuately shaped bars or elements 108 are adapted to be moved to a position wherein the ratchet teeth 110 are out of the path of movement of the pawl 112 to effect a release of the lever construction from brake-setting position for movement to brake release position. A releasable means normally retains the bars 108 in a position whereby the pawl member 112 engages the ratchet 110 during movement of the lever 60 to brake-setting position and holds the lever 60 in such position. A keeper member or latch means 120 is normally engaged with the distal ends of the bars or elements 108 to retain them in a position with the ratchet teeth 110 in the path of movement of the pawl 112.

In the embodiment illustrated, the latch or keeper means 120 is preferably formed of two identically shaped members 122 which may be welded together. The members 122 forming the keeper 120 are bored to be received on a rivet or stub shaft 124, the rivet having a tenon portion 125 secured to a raised or embossed portion 126 of the stationary bracket or support 62 as shown in FIGURE 5. The keeper 120 is thus pivotally supported for movement about the axis of the rivet 124. It is to be understood that the keeper member may be pivotally supported by other means if desired.

The keeper means 120 depends from the rivet 124, the members 122 of the keeper being formed with a forwardly extending projection 128 forming a ledge 130 adapted to engage projections 132 extending from the distal ends of the members 108. The ratchet members or arcuate bars 108 are shown in engagement with the ledge 130 of the keeper members 122 in FIGURE 6. In this position the pawl member 112 is adapted for cooperative engagement with the ratchet teeth 110 to hold the brake mechanism in set position, such position of the lever 60 being illustrated in FIGURE 7.

Plates 134 are welded to the outer surfaces of the members 122 and extend forwardly so as to straddle the projecting portions 132 of the bars 108 to secure proper relation of the bars with the ledge 130 and prevent lateral displacement of the bars. Through the provision of the plates 134, the distal ends of the ratchet elements 108 are maintained in longitudinal aligned relation with the members 122 of the keeper means 120. The keeper means 120 is provided with a rearwardly extending manipulating means including a rod 136, one end being welded to the lower regions of the members 122.

The opposite end of the rod 136 is provided with an operating means such as a handle or grip member 138 which, as shown in FIGURE 1, may be located adjacent the lower edge region of the instrument panel 22. The keeper means 120 is normally held in engaging relation or is biased toward engaging relation with the adjacent ends of the arcuately shaped bars 108 under the influence of a resilient means or spring 140.

In the embodiment illustrated, a central region of the spring 140 is coiled about the rivet 125, one end 142 of the spring engaging a transversely extending portion 144 formed on the support 62, the other end of the spring engaging an offset region 145 of the rod 136 in the manner shown in FIGURES 5, 6 and 7.

When the keeper means 120 is pivoted about its support 124 in a counterclockwise direction as viewed in FIGURES 6 and 7, the projection 128 moves rearwardly out of engagement with the projections 132 at the ends of the bars 108, which action permits the bars 108 to swing downwardly about the axis of the supporting rivet or stub shaft 102. This action moves the ratchet teeth 110 downwardly away from the pawl 112. The downward pivotal movement of the pawl 112 is limited by inwardly embossed portions 148 formed on the lever sections 68 and 70 as shown in FIGURE 3, the embossed portions being of circular shape as illustrated in broken lines in FIGURE 6.

The position of the embossments 148, which form abutment or movement limiting means for the pawl 112, are disposed so that the pawl 112 engages the embossments when the bars 108 are released by the keeper means 120 whereby the pawl is held above and out of engagement with the ratchet teeth 110 during return movement of the lever 60 toward brake release position. The broken line position shown at 150 in FIGURE 7 is illustrative of the brake release position of the bars 108 when the keeper means 120 is disengaged from the ends of the bars.

The arrangement illustrated provides for cooperating means on the lever 60 and the bars 108 for returning the bars 108 into engagement with the ledge 130 of the keeper means 120 as the foot-operated lever 60 approaches brake release position. As shown in FIGURES 6 and 7, a land or cam surface 152 is formed on each of the bars 108 and is of greater radius than the lower curved surfaces 154 of the bars 108. The land or cam surfaces 152 are opposite a region 154 of the upper surfaces of the bars 108 which is devoid of ratchet teeth. The upper terminus 156 of the flange means 72 of the lever sections is disposed in the relative position shown in FIGURE 7 with respect to the bars 108 when the latter are in engagement with the ledge on the keeper means. When the keeper is released by upward movement of the member 138, the bars 108 drop or swing about the axis of the stub shaft 122 and are limited in their downward movement by engagement with the region 156 of the flanges 72. In this position the end surface of the projections 132 on the bars 108 abut the end surfaces of the projections 128 on the members 122 forming the keeper means 120.

As the foot-operated lever 60 moves toward release position, the region 156 on the flanges 72 of the lever engage the land or cam means 152 as shown in FIGURE 6, swinging the bars 108 in a counterclockwise direction about the axis of the stub shaft 102 as viewed in FIGURE 6, to move the projections 132 above the projections 128 so that the projections 132 reengage the ledge 130 and retain the bars 108 in their operative position as shown in FIGURE 6.

Thus the region 156 on the mating flanges 72 of the lever construction performs dual functions, it limits the downward swinging movement of the bars 108, and, upon return movement of the lever 60 toward brake release position, engages the cam means 152 to reengage the bars with the ledge 130 formed on the keeper means 120.

The operation of the arrangement is as follows: The brake-actuating foot-operated lever 60 is shown in brake release position in FIGURES 1 and 6. In this position, the cable 48, the link 46 and brake rod 34 are in the positions illustrated in FIGURE 1 with the brakes released.

When the operator desires to set the parking or emergency brakes, foot pressure is applied to the foot pad 84 to swing the lever 60 about its fulcrum 100 to a brake-setting position such as that illustrated in FIGURE 7. This movement of the brake actuating lever 60 moves the flexible cable 48 upwardly through the clevis connection 80 with the load arm 78 of the lever 60.

During this movement of the lever 60 toward brake-setting position, the arcuately shaped bars or elements 108 are engaged with the keeper means 120 as shown in FIGURES 6 and 7 whereby the ratchet teeth 110 are disposed in an arc generated about the axis of the fulcrum or rivet 100 whereby the pawl 112 carried by the lever rides along the ratchet teeth 110 and engages a tooth when the brakes are in set position to hold the brakes in such position, the pawl and ratchet means being illustrated in brake-setting relation in FIGURE 7.

When it is desired to release the parking or emergency brake mechanism, the operator moves the member 138 upwardly, swinging the keeper means 120 to the broken line position shown in FIGURE 7 to retract the projections 128 of the keeper means from engagement with the projections 132 formed on the bars 108. The bars 108, being out of engagement with the ledge 130 on the keeper means, swing downwardly in a clockwise direction about the axis of the rivet 102 to the broken line position indicated at 150 in FIGURE 7.

During this downward movement of the bars 108, the pawl 112 swings in a clockwise direction under the influence of the spring 118 until its movement is interrupted by its engagement with the embossed regions 148 formed inwardly of the lever sections 68 and 70. These embossments or abutment means limit the downward swinging movement of the pawl 112 to disengage the pawl from the teeth 110.

When this occurs, the tension of the brake springs and the tension of the spring 54 acting through the cable 48 swings the foot-operated lever 60 about its fulcrum in a counterclockwise direction, as viewed in FIGURES 6 and 7, whereby the lever 60 moves from a brake-setting position as illustrated in FIGURE 7 toward a brake release position indicated in FIGURE 6. As the lever 60 approaches the brake release position, the region 156 of the flange means 72 on the lever sections engages the land or cam surfaces 152 on the bars 108, causing the bars to be swung upwardly or in a counterclockwise direction as viewed in FIGURE 7 to reengage the end regions 132 of the bars with the ledge 130 provided by the projection 128 on the keeper means 120.

In brake release position, the components are in the position illustrated in FIGURE 6. The cooperative action of the lever flange means 72 engaging the cam 152 takes place opposite the region 154 of the bars 108 which is devoid of ratchet teeth so that reengagement of the keeper means 120 with the bars 108 is assured. When the keeper means 120 is released, the end surfaces of the projections 132 on the bars 108 engages the end surface region of the projections 128 on the members 122 of the keeper means so that upon return movement of the lever 60 toward brake release position the projecting portions 132 slide upwardly along the end surface region of the projections 128 until the projections 132 engage the ledge on the keeper means 120.

Through this arrangement the keeper 120 is biased under the influence of the spring 140 to operative position so that when the projections 132 are above the ledge 130, they are engaged by the keeper 120 to support the arcuately shaped bars 108 carrying the ratchet teeth 110 in a position for cooperative relation or association with the pawl 112.

It should be noted that the foot-operated lever functions to return the arcuately shaped bars 108 into cooperative relation with the pawl 112 as the lever approaches brake release position. The arrangement of the invention with the ratchet member disposed beneath the fulcrum of the lever 60 provides for the utilization of comparatively large teeth of the ratchet 110 because the arms or bars 108 carrying the ratchet teeth may be disposed at a substantial distance from the lever fulcrum 100.

It is apparent that, within the scope of the invention, modifications and different arrangements may be made other than as herein disclosed, and the present disclosure is illustrative merely, the invention comprehending all variations thereof.

I claim:

1. Mechanism for controlling brakes of a vehicle including, in combination, a support, a foot-operated lever fulcrumed intermediate its ends on the support, one arm of the lever being adapted to be connected with the vehicle brake mechanism, the other arm of the lever having a foot pad portion, means for retaining the lever in brake-setting positions including cooperating pawl and ratchet members, one of said members being articulately connected with the support and the other carried by the lever, the member carried by the lever being disposed between the fulcrum and the foot pad portion, a movable element mounted by the support having a ledge adapted to be engaged by the member connected with the support for normally retaining said member in cooperative relation with the member carried by the lever; said element being movable to a position to release said pawl and ratchet members from engaging relation, means formed on the lever for limiting the relative movement of the member connected with the support when the said element is moved to release position, and means formed on the member connected with the support arranged to be engaged by the lever upon return movement of the lever to brake releasing position to reengage the said member with the ledge on said element.

2. Mechanism for controlling parking brakes of a vehicle including, in combination, a support, a foot-operated lever fulcrumed intermediate its ends on the support, a ratchet bar journaled for pivotal movement on the support, a relatively movable keeper element mounted by the support normally engaging said ratchet bar, a pivotally supported pawl carried by said lever arranged for cooperation with said ratchet member for retaining the lever in brake-setting positions, said keeper element being movable to a release position whereby said ratchet member is disengaged from said pawl to release said lever from brake-setting position, and abutment means movable with the lever operable upon return movement of the lever to brake release position for reestablishing cooperative engagement of the ratchet member with the keeper element.

3. Mechanism for controlling brakes of a vehicle including, in combination, a support, a foot-operated lever formed of sheet metal and having spaced parallel walls, fulcrum means for the lever comprising a hollow member secured to the support, said member being formed with two cylindrical surfaces of different diameters generated about the same axis, the walls of the lever having openings formed therein to fit respectively the cylindrical surfaces on said hollow member whereby said lever is fulcrumed for movement about the common axis of said cylindrical surfaces, said lever arranged to be connected with the vehicle brakes a bar pivotally carried by the support and having ratchet teeth formed thereon, pawl means carried by said lever cooperable with the ratchet teeth on said bar for retaining the lever in brake-setting positions, a keeper element mounted by the support adapted for engagement with the bar for retaining the bar in position to be engaged by said pawl means, said element being movable to a position to effect disengagement of the bar from the pawl means for releasing the lever, and abutment means on said lever operable upon movement of the lever to brake release position for reengaging the bar with said element.

4. Mechanism for controlling brakes of a vehicle including, in combination, a support element, a foot-operated lever element fulcrumed intermediate its ends on the support element, one arm of the lever element being adapted to be connected with the vehicle brake mechanism, the other arm of the lever element having a foot pad portion, means for retaining the lever element in brake-setting positions including cooperating members, one of said members being movably mounted on the support element and the other carried by the lever element, the member carried by the lever element being disposed between the fulcrum of the lever element and the foot pad portion, a movably mounted keeper carried by said support element engageable with the member mounted on the support element for normally retaining the member mounted on the support element in the path of movement of the member carried by the lever element, said keeper being movable to a position whereby said members are in disengaged relation, and means movable with the lever element adapted to actuate the member mounted on the support element to a position in the path of movement of the member carried by the lever element upon movement of the lever element toward brake release position.

5. Mechanism for controlling brakes of a vehicle including, in combination, a support element, a foot-operated lever element fulcrumed intermediate its ends on the support element, one arm of the lever element being adapted to be connected with the vehicle brake mechanism, the other arm of the lever element having a foot pad portion, means for retaining the lever element in brake-setting positions including cooperating pawl and ratchet members, one of said members being movably mounted by the support element and the other of said members carried by the lever element, a pivotally movable keeper mounted by the support element engageable with the member mounted by the support element for normally retaining the member mounted by the support element in the path of movement of the member carried by the lever element, said keeper being movable to a position to effect disengagement of the pawl and ratchet members, and abutment means movable with the lever element adapted to engage the member mounted by the support element with said keeper upon movement of the lever element to brake release position.

6. Mechanism for controlling brakes of a vehicle including, in combination, a support element, a foot-operated lever element fulcrumed intermediate its ends on the support element, one arm of the lever element being adapted to be connected with the vehicle brake mechanism, the other arm of the lever element having a foot pad portion, means for retaining the lever element in brake-setting positions including cooperating pawl and ratchet members, said ratchet member being articulately connected with the support element and said pawl member carried by the lever element, a pivotally movable keeper mounted by the support element engageable with the ratchet member for normally retaining said ratchet member in the path of movement of the pawl member, said keeper being movable to a position to release the ratchet member for movement out of engagement with the pawl member, and cooperating means on the lever element and ratchet member adapted to reengage the ratchet member with the keeper upon movement of the lever element to brake release position.

7. Mechanism for controlling brakes of a vehicle including, in combination, a support element, a foot-operated lever element fulcrumed intermediate its ends on the support, one arm of the lever element being adapted to be connected with the vehicle brake mechanism, the other arm of the lever element having a foot pad portion, means for retaining the lever element in brake-setting positions including two cooperating members, one of said members being articulately mounted by the support element and the other member carried by the lever element, a movable keeper mounted by the support element having a ledge adapted to be engaged by the member mounted by the support element for normally retaining the said member in cooperative relation with the member carried by the lever element, said keeper being movable to a position whereby to release the member mounted by the support element from engagement with the member carried by the lever element, means for limiting the relative movement of the member mounted by the support element when the said member is released from the keeper, and means formed on the member mounted by the support element arranged to be engaged by the lever element upon return movement of the lever element to brake releasing position to reengage the member mounted by the support element with the ledge on said keeper.

8. Mechanism for controlling parking brakes of a vehicle including, in combination, a support, a foot-operated lever arranged to be connected with the vehicle parking brakes, a cup-shaped member secured to and extending from said support, a stub shaft member extending from the support, said foot-operated lever being formed with spaced parallel walls and having a foot pad at one end thereof, said lever being mounted on said cup-shaped member for movement about the axis thereof, a first element journaled for pivotal movement on the stub shaft member and extending between the parallel walls of the lever, a second element mounted on the lever arranged for cooperation with the first element for retaining the lever in brake-setting positions, a relatively movable keeper mounted by the support normally retaining said first element in engaging relation with the second element, said keeper being movable to a position releasing said first element from engagement with the second element to release the lever from brake-setting position, and means provided on the lever adapted to reengage the first element with the keeper upon return movement of the lever to brake release position.

9. Mechanism for controlling parking brakes of a vehicle including, in combination, a support formed with reinforcing flange means, a cup-shaped member secured to and extending laterally from said support, a foot-operated lever formed with spaced parallel walls and having a foot pad at one end thereof, said lever being fulcrumed on said cup-shaped member and arranged to be connected with the vehicle parking brakes, a ratchet bar journaled on the support for pivotal movement, said ratchet member extending between the parallel walls of the lever, a relatively movable keeper mounted by the support normally engaging said ratchet bar, a pivotally supported pawl carried by said lever arranged for cooperation with said ratchet member for retaining the lever in brake-setting positions, resilient means normally biasing said keeper into operative engagement with the ratchet member, said keeper being movable to a release position whereby said ratchet member is disengaged from said pivotally supported pawl to release said lever from brake-setting position, and means mounted by the lever engageable with the ratchet bar upon return movement of the lever to brake release position for reestablishing cooperative engagement of the ratchet member with the keeper.

10. Mechanism for controlling brakes of a vehicle including, in combination, a support formed of sheet metal, a foot-operated lever formed of sheet metal and having spaced parallel walls, fulcrum means for the lever comprising a cup-shaped member secured to the support, said lever arranged to be connected with the vehicle brakes, said member being formed with two cylindrical surfaces of different diameters generated about a common axis, the walls of the lever having circular openings formed therein to fit the cylindrical surfaces on said cup-shaped member whereby said lever is fulcrumed for movement about the axis of said cylindrical surfaces, cooperable elements respectively carried by said lever and said support and being interengageable for retaining said lever in brake-setting positions, and a keeper mounted by the support engageable with the element carried by the support for normally retaining the said element in engagement with the element carried by the lever, said keeper being movable to a position out of engagement with the element carried by the support, and means formed on the lever for reengaging the element carried by the support with the keeper upon movement of said lever to brake release position.

11. Mechanism for controlling brakes of a vehicle including, in combination, a support formed of sheet metal, a foot-operated lever formed of sheet metal and having spaced parallel walls, fulcrum means for the lever comprising a cup-shaped member secured to the support, said member being formed with two cylindrical surfaces of different diameters generated about a common axis, the walls of the lever having openings formed therein to fit respectively the cylindrical surfaces on said cup-shaped member whereby said lever is fulcrumed for movement about the axis of said cylindrical surfaces, means engageable with said cup-shaped member and said lever for securing the lever against lateral displacement, said lever arranged to be connected with the vehicle brakes an arcuately shaped bar pivotally carried by the support and having ratchet teeth formed on the concave curvature of the bar, pawl means carried by said lever cooperable with the ratchet teeth for retaining the lever in brake-setting positions, a keeper mounted by the support adapted for engagement with the arcuately shaped bar for retaining the bar in position to be engaged by said pawl means and movable to a position to effect disengagement of the bar from the pawl means for releasing the lever, a hand grip for controlling said element, and abutment means formed on the lever arranged for engagement with the rack bar upon movement of the lever toward brake release position for reengaging the bar with said element.

12. Mechanism for controlling brakes of a vehicle including, in combination, a support formed of sheet metal, a foot-operated lever formed of sheet metal and having spaced parallel walls, fulcrum means for the lever comprising a cup-shaped member secured to the support, said member being formed with two cylindrical surfaces of different diameters generated about a common axis, the walls of the lever having openings formed therein to fit respectively the cylindrical surfaces on said member whereby said lever is fulcrumed for movement about the axis of said cylindrical surfaces, said lever being arranged to be connected with the vehicle brakes means engageable with said member and said lever for securing the lever against lateral displacement, an arcuately shaped bar pivotally carried by the support and having ratchet teeth formed on the concave curvature of the bar, pawl means carried by said lever cooperable with the ratchet teeth for retaining the lever in brake-setting positions, a keeper element pivotally mounted on said support adapted for engagement with the arcuately shaped bar for retaining the bar in position to be engaged by the pawl means, said keeper element being movable to a position to effect disengagement of the bar from the pawl means for releasing the lever, and abutment means on said bar and lever arranged for engagement upon return movement of the lever to brake release position for reengaging the bar with said keeper element.

References Cited in the file of this patent

UNITED STATES PATENTS

| | | |
|---|---|---|
| 464,724 | Rogers | Dec. 8, 1891 |
| 738,100 | Cuntz | Sept. 1, 1903 |
| 1,314,210 | Purcell | Aug. 26, 1919 |
| 1,323,661 | Urton | Dec. 2, 1919 |
| 1,532,868 | Blackburn | Apr. 7, 1925 |
| 1,568,006 | Talley | Dec. 29, 1925 |
| 2,128,298 | Jandus | Aug. 30, 1938 |
| 2,610,876 | Roethel | Sept. 16, 1952 |
| 2,884,805 | Krause | May 5, 1959 |
| 2,908,185 | Koskela | Oct. 13, 1959 |

FOREIGN PATENTS

| | | |
|---|---|---|
| 431,269 | Great Britain | July 1, 1935 |